United States Patent [19]
Rutten

[11] Patent Number: 5,119,241
[45] Date of Patent: Jun. 2, 1992

[54] MIRROR SYSTEM FOR A TRUCK

[76] Inventor: John W. Rutten, Rte. 1, Box 115, Mapleton, N. Dak. 58059

[21] Appl. No.: 462,094

[22] Filed: Jan. 8, 1990

[51] Int. Cl.⁵ .......................... G02B 5/08; G02B 7/18
[52] U.S. Cl. .................................. 359/861; 359/844; 359/881
[58] Field of Search ................ 350/600–611, 350/616–627, 631–632, 574–577; 359/838–844, 855–862, 871–872, 879–881; 248/476–480

[56] References Cited

U.S. PATENT DOCUMENTS

| | | | |
|---|---|---|---|
| 1,939,311 | 12/1933 | Mort | 350/574 |
| 3,671,110 | 6/1972 | Wassenhove | 350/632 |
| 3,744,885 | 7/1973 | Hurtado et al. | 350/307 |
| 3,915,562 | 10/1975 | Ermlich | 350/622 |
| 4,114,989 | 9/1978 | Badgley | 350/622 |
| 4,277,142 | 7/1981 | Gardner | 350/622 |
| 4,291,946 | 9/1981 | Lely | 350/618 |
| 4,435,044 | 3/1984 | Hanin | 350/302 |
| 4,441,790 | 4/1984 | Williams et al. | 350/618 |
| 4,469,405 | 9/1984 | Chin-Wun | 350/302 |
| 4,701,036 | 10/1987 | Bowers | 350/622 |
| 4,893,915 | 1/1990 | Taguma | 350/600 |
| 4,925,287 | 5/1990 | Lord et al. | 350/632 |

FOREIGN PATENT DOCUMENTS 272032  8/1964  United Kingdom ................ 350/622

Primary Examiner—Bruce Y. Arnold
Assistant Examiner—Thong Nguyen
Attorney, Agent, or Firm—Zarley McKee Thomte Voorhees & Sease

[57] ABSTRACT

A mirror system is disclosed for use on the roof of a truck cab to enable the driver of the truck to view the interior of the body of the truck to ascertain the loading condition thereof. The view of the interior of the body of the truck is consecutively reflected by three mirrors which are selectively adjustably mounted on the roof of the truck cab.

16 Claims, 3 Drawing Sheets

MIRROR SYSTEM FOR A TRUCK

BACKGROUND OF THE INVENTION

This invention relates to a mirror system for a truck and more particularly to a mirror system which enables the driver or other occupant of a truck to ascertain the loading condition of an open body positioned rearwardly of the truck cab.

Grain trucks or the like normally have an open body positioned rearwardly of the truck cab. During combining operations, the grain truck is normally driven alongside a moving combine to enable the combine to discharge the grain from the grain tank, through an unloading auger, into the truck body. It is extremely difficult for the truck driver to position the moving truck with respect to the moving combine during the unloading operation to ensure that grain is unloaded or augered into the truck body. The operation is made even more difficult as the body becomes filled with the result frequently being that grain is spilled onto the ground.

Additionally, grain is frequently removed from a granary or the like and is augered or conveyed into the truck body for transport to an elevator facility. Since the upper end of the 1 truck body is positioned a considerable height above the ground, the monitoring of the loading operation can only be accomplished by climbing to the top of the truck body to peer inside thereof.

It is therefore a principal object of the invention to provide a mirror system for a truck which enables the truck driver or other occupant to view the loading operation within the truck body whether the truck is receiving grain from a combine or conventional grain auger.

Yet another object of the invention is to provide a mirror system for a truck of the type described herein which is adjustably mounted.

Still another object of the invention is to provide a mirror system for a truck of the type described herein wherein the major components thereof may be removed during period of non-use.

Still another object of the invention is to provide a mirror system which provides a clear view into the interior of the truck body which is located rearwardly of the truck cab.

Yet another object of the invention is to provide a mirror system for a truck which is economical of manufacture, durable in use and refined in appearance.

These and other objects of the present invention will be apparent to those skilled in the art.

SUMMARY OF THE INVENTION

Figure 1:
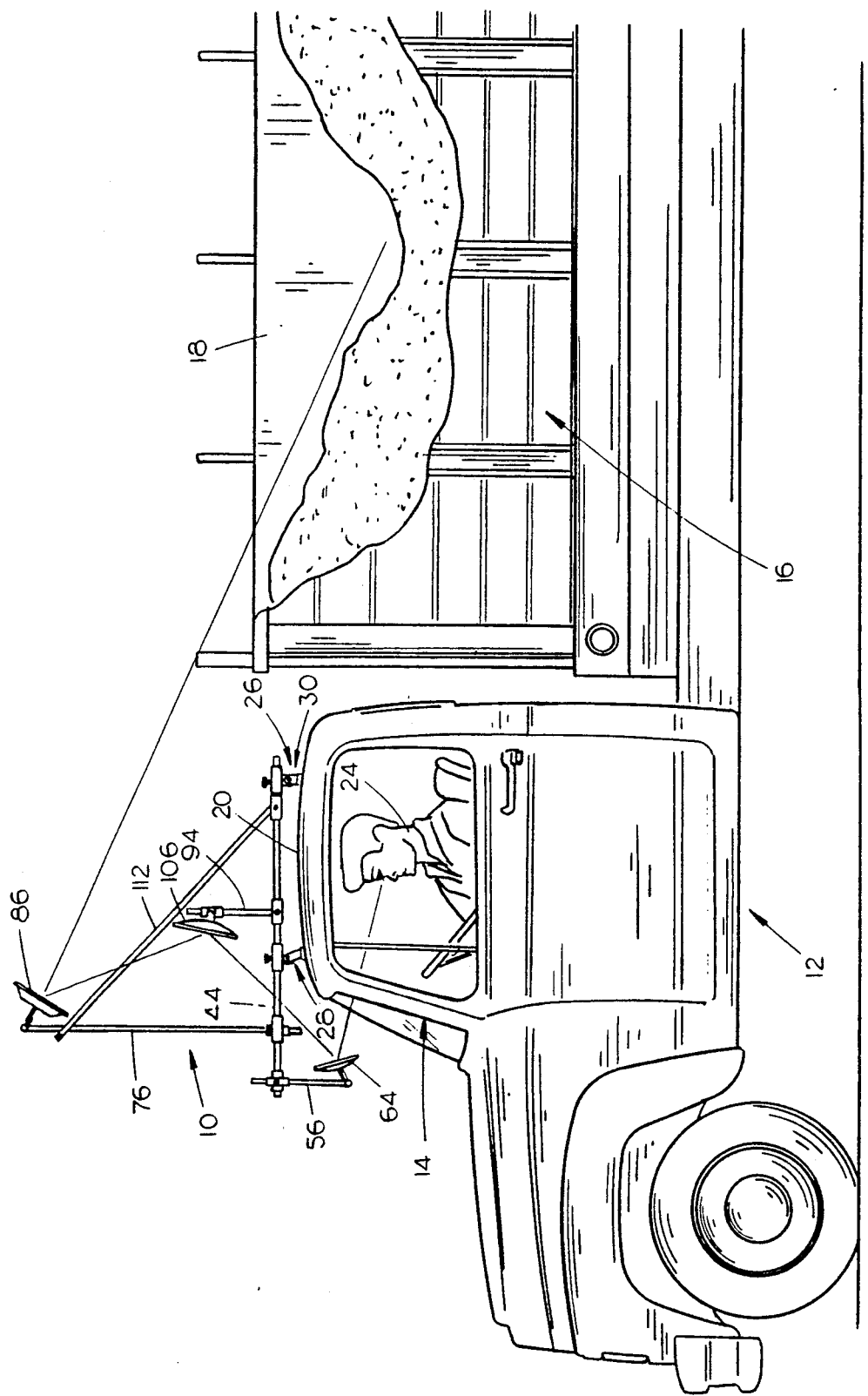
FIG. 1 is a side view illustrating the mirror system of this invention with a portion of the truck body broken away to more fully illustrate the operation of the mirror system.

A mirror system is provided to enable the truck driver or other occupant of a truck to view the interior of the open truck body located rearwardly of the cab. A support means is provided on the roof of the cab and has a first mirror secured thereto which is adjustably positioned forwardly of the upper portion of the windshield of the cab. A second mirror is also secured to the support means and is positioned rearwardly and upwardly of the first mirror. A third mirror is positioned forwardly of and above the second mirror and is also adjustably mounted on the support means. The mirrors are positioned so that a view into the interior of the body will be consecutively reflected by the third mirror, the second mirror, and the first mirror respectively for viewing by the truck driver to enable the driver to ascertain the loading condition of the body.

DESCRIPTION OF THE PREFERRED EMBODIMENT

The mirror system of this invention is referred generally by the reference numeral 10 while the numeral 12 refers to a truck having a cab 14 positioned forwardly of a truck body 16 having an open upper end 18.

Mirror system 10 is mounted on the roof 20 of the cab 14 in which the driver 24 or other occupant is sitting. Mirror system 10 includes a support means 26 comprising a forward bracket assembly 28 and a rear bracket assembly 30. Forward bracket assembly 28 includes brackets 32 and 34 which are secured to roof 20 by bolts or the like and which have tubular members 36 0 secured thereto which extends therebetween.

Tubular member 38 is secured to tubular member 36 intermediate the ends thereof by welding or the like and has a nut 40 welded thereto which has a bolt 42 adjustably threadably mounted therein adapted to engage tubular member 44 positioned in tubular member 38.

Rear bracket assembly 30 includes brackets 32' and 34' which are secured to roof 20 by bolts or the like and which have tubular member 36' secured thereto which extends therebetween. Tubular member 43 is secured to tubular member 36' intermediate the ends thereof by welding or the like and has a nut 46 welded thereto which has a bolt 48 adjustably threadably mounted therein adapted to engage tubular member 44 positioned in tubular member 43. Thus, tubular member 44 is longitudinally adjustably mounted in tubular members 38 and 43.

Tubular member 50 of bracket 52 is longitudinally adjustably mounted on tubular member 44 and has a vertically disposed tubular member 54 secured thereto by welding or the like. Tubular member 56 is vertically adjustably received in tubular member 54 by means of bolt assembly 58 and has a transversely extending pipe stub 60 extending horizontally therefrom which is adapted to selectively rotatably receive pipe 62 which is adjustably attached to mirror 64 by bolt 66.

Figure 2:
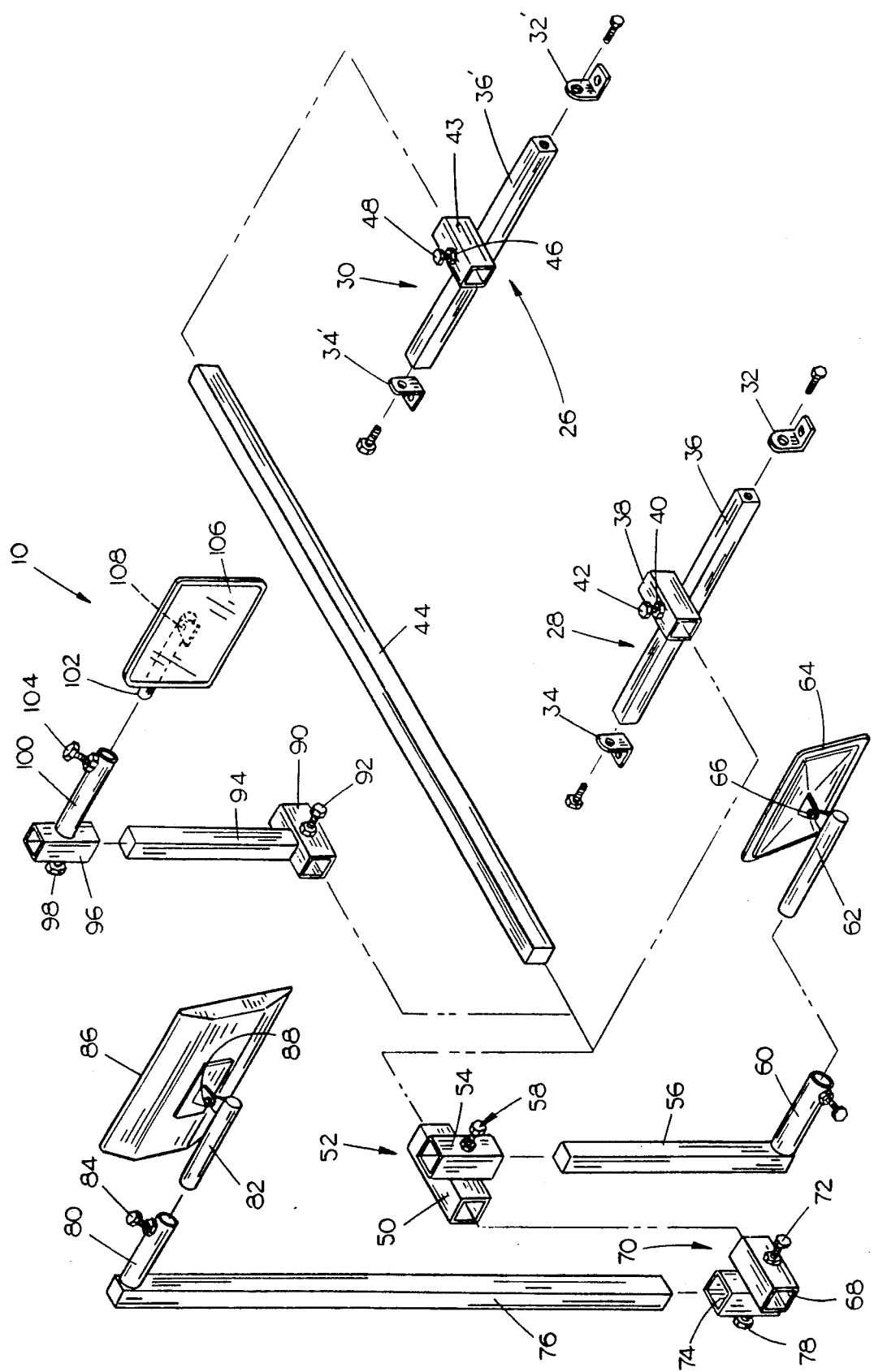
FIG. 2 is an exploded perspective view of the mirror system of this invention.

Tubular member 68 of bracket 70 is longitudinally adjustably mounted on the forward end of tubular member 44 by bolt assembly 72 and has a vertically disposed tubular member 74 secured thereto by welding or the like as seen in FIG. 2. Tubular member 76 is vertically adjustably received in tubular member 74 and is held therein by bolt assembly 78. Pipe stub 80 extends transversely from the upper end of tubular member 76 and has a pipe 82 selectively rotatably mounted therein by means of bolt assembly 84. Mirror 86 is selectively adjustably secured to pipe 82 by means of bolt 88.

Tubular member 90 is longitudinally adjustably mounted on tubular member 44 by means of bolt assembly 92 and has tubular member 94 extending vertically upwardly therefrom as seen in FIG. 2. Tubular member 96 is adjustably vertically mounted on tubular member 94 by bolt assembly 98 and has pipe stub 100 extending transversely therefrom. Pipe stub 102 is selectively adjustably rotatably and longitudinally adjustably mounted in pipe stub 100 by means of bolt assembly 104. Mirror 106 is secured to pipe 102 by bolt 108.

Figure 3:
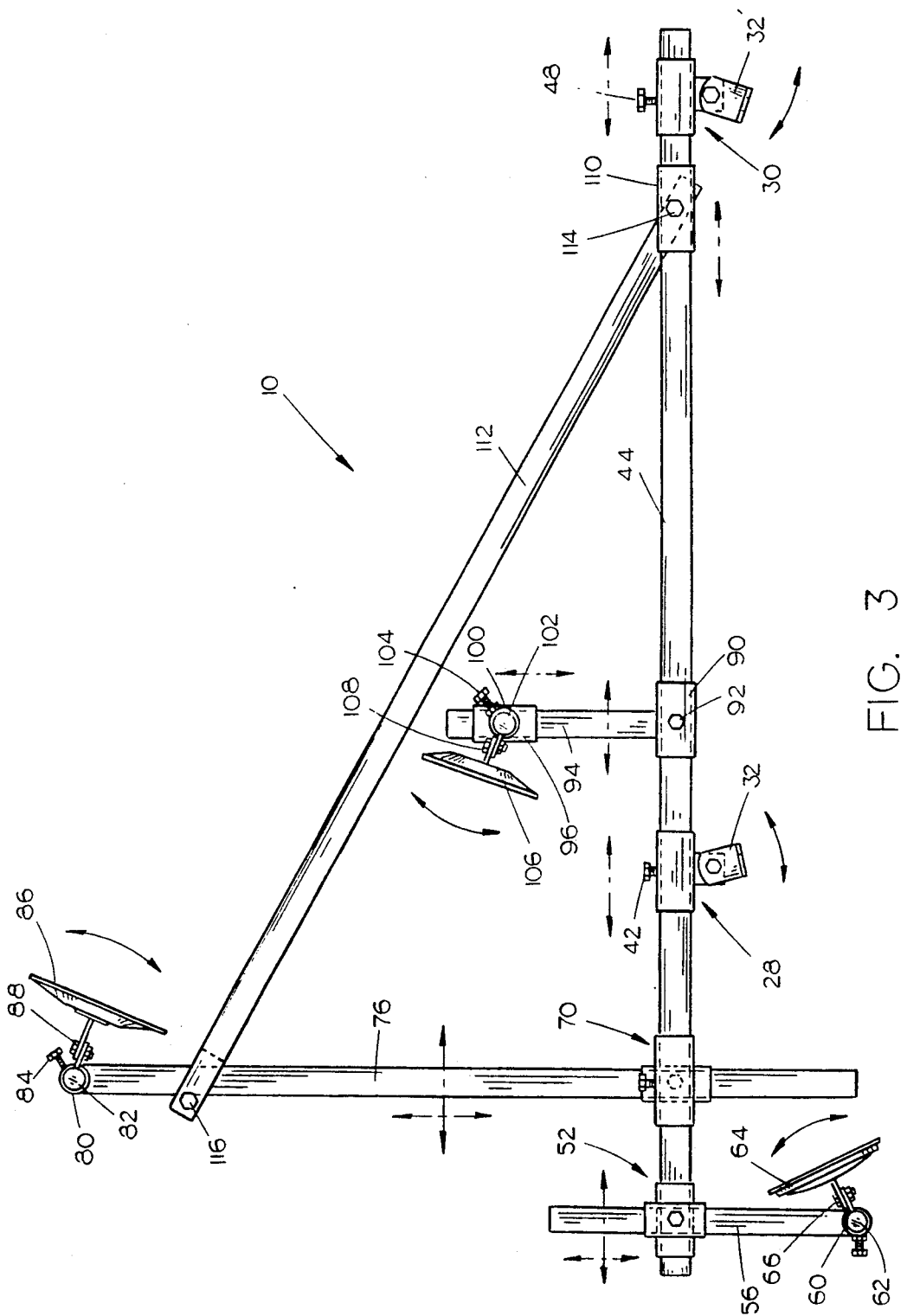
FIG. 3 is a side view of the mirror system with the arrows indicating the possible movement of the various components.

As seen in FIG. 3, tubular member 110 is longitudinally adjustably secured to tubular member 44 adjacent the rearward end thereof and has a brace 112 pivotally secured thereto by bolt 114. The upper forward end of brace 112 embraces tubular member 76 and is adjustably secured thereto by bolt 116.

Thus, the mirror system 10 of this invention is mounted on the roof of the cab and the various mirrors and tubular members may be selectively adjustably positioned relative to one another so that the driver 24 may view the interior of the body 18 to ascertain to loading condition thereof. As seen in FIG. 1, the driver may look through the windshield of the cab to view into the interior of the body with a view of the interior of the body being consecutively reflected by the mirror 86, mirror 106 and mirror 64. The various mirrors may be adjusted to compensate for the height of the driver, height of the cab, height of the body 16, etc. Thus, it can be seen that a novel mirror system has been provided which accomplishes at least all of its stated objectives. It should be noted that a pair of mirrors may be utilized rather three mirrors to view the interior of the body although the view to the operator will be inverted. Thus, it is preferred that three mirrors be utilized.

I claim:

1. In combination with a truck having an open truck body positioned rearwardly of a cab including a windshield and a roof, said windshield having upper and lower ends, said roof having rearward and forward ends,
   a mirror system mounted on the roof of the cab to enable a person within the cab to ascertain the loading condition of the truck body without leaving the cab,
   said mirror system comprising a mirror support means secured to the roof of the cab, a first mirror secured to said mirror support means and positioned forwardly of the cab windshield adjacent the upper end thereof so that the mirror is visible to the person within the cab, a second mirror secured to said mirror support means above said first mirror and rearwardly thereof with said second mirror facing said first mirror, a third mirror secured to said mirror support means and positioned above and forwardly of said second mirror with said third mirror facing said second mirror, said third mirror being positioned above the body and forwardly thereof so that a view into the interior of the body will be consecutively reflected by said third mirror, said second mirror, and said first mirror respectively for viewing by the person within the cab to enable the person to ascertain the loading condition of the body,
   and means for selectively vertically adjustably mounting that first mirror on said mirror support means.

2. In combination with a truck having an open truck body positioned rearwardly of a cab including a windshield and a roof, said windshield having upper and lower ends, said roof having rearward and forward ends,
   a mirror system mounted on the roof of the cab to enable a person within the cab to ascertain the loading condition of the truck body without leaving the cab,
   said mirror system comprising a mirror support means secured to the roof of the cab, a first mirror secured to said mirror support means and positioned forwardly of the cab windshield adjacent the upper end thereof so that the mirror is visible to the person within the cab, a second mirror secured to said mirror support means above said first mirror and rearwardly thereof with said second mirror facing said first mirror, a third mirror secured to said mirror support means and positioned above and forwardly of said second mirror with said third mirror facing said second mirror, said third mirror being positioned above the body and forwardly thereof so that a view into the interior of the body will be consecutively reflected by said third mirror, said second mirror, and said first mirror respectively for viewing by the person within the cab to enable the person to ascertain the loading condition of the body,
   and means for longitudinally adjustably mounting said first mirror on said mirror support means.

3. In combination with a truck having an open truck body positioned rearwardly of a cab including a windshield and a roof, said windshield having upper and lower ends, said roof having rearward and forward ends,
   a mirror system mounted on the roof of the cab to enable a person within the cab to ascertain the loading condition of the truck body without leaving the cab,
   said mirror system comprising a mirror support means secured to the roof of the cab, a first mirror secured to said mirror support means and positioned forwardly of the cab windshield adjacent the upper end thereof so that the mirror is visible to the person within the cab, a second mirror secured to said mirror support means above said first mirror and rearwardly thereof with said second mirror facing said first mirror, a third mirror secured to said mirror support means and positioned above and forwardly of said second mirror with said third mirror facing said second mirror, said third mirror being positioned above the body and forwardly thereof so that a view into the interior of the body will be consecutively reflected by said third mirror, said second mirror, and said first mirror respectively for viewing by the person within the cab to enable the person to ascertain the loading condition of the body,
   and means for horizontally adjustably mounting said first mirror on said mirror support means.

4. In combination with a truck having an open truck body positioned rearwardly of a cab including a windshield and a roof, said windshield having upper and lower ends, said roof having rearward and forward ends,
   a mirror system mounted on the roof of the cab to enable a person within the cab to ascertain the loading condition of the truck body without leaving the cab,
   said mirror system comprising a mirror support means secured to the roof of the cab, a first mirror secured to said mirror support means and positioned forwardly of the cab windshield adjacent the upper end thereof so that the mirror is visible to the person within the cab, a second mirror secured to said mirror support means above said first mirror and rearwardly thereof with said second mirror facing said first mirror, a third mirror secured to said mirror support means and positioned above and forwardly of said second mirror with said third mirror facing said second mirror, said third mirror being positioned above the body and forwardly thereof so that a view into the interior of the body will be consecutively reflected by said third mirror, said second mirror, and said first mirror respectively for viewing by the person within the cab to enable the person to ascertain the loading condition of the body, and means for vertically and longitudinally adjustably mounting said first mirror on said mirror support means.

5. In combination with a truck having an open truck body positioned rearwardly of a cab including a windshield and a roof, said windshield having upper and lower ends, said roof having rearward and forward ends, a mirror system mounted on the roof of the cab to enable a person within the cab to ascertain the loading condition of the truck body without leaving the cab, said mirror system comprising a mirror support means secured to the roof of the cab, a first mirror secured to said mirror support means and positioned forwardly of the cab windshield adjacent the upper end thereof so that the mirror is visible to the person within the cab, a second mirror secured to said mirror support means above said first mirror and rearwardly thereof with said second mirror facing said first mirror, a third mirror secured to said mirror support means and positioned above and forwardly of said second mirror with said third mirror facing said second mirror, said third mirror being positioned above the body and forwardly thereof so that a view into the interior of the body will be consecutively reflected by said third mirror, said second mirror, and said first mirror respectively for viewing by the person within the cab to enable the person to ascertain the loading condition of the body, and means for vertically adjustably mounting said first mirror on said mirror support means.

6. In combination with a truck having an open truck body positioned rearwardly of a cab including a windshield and a roof, said windshield having upper and lower ends, said roof having rearward and forward ends, a mirror system mounted on the roof of the cab to enable a person within the cab to ascertain the loading condition of the truck body without leaving the cab, said mirror system comprising a mirror support means secured to the roof of the cab, a first mirror secured to said mirror support means and positioned forwardly of the cab windshield adjacent the upper end thereof so that the mirror is visible to the person within the cab, a second mirror secured to said mirror support means above said first mirror and rearwardly thereof with said second mirror facing said first mirror, a third mirror secured to said mirror support means and positioned above and forwardly of said second mirror with said third mirror facing said second mirror, said third mirror being positioned above the body and forwardly thereof so that a view into the interior of the body will be consecutively reflected by said third mirror, said second mirror, and said first mirror respectively for viewing by the person within the cab to enable the person to ascertain the loading condition of the body, and means for transversely horizontally adjustably mounting said first mirror on said mirror support means.

7. In combination with a truck having an open truck body positioned rearwardly of a cab including a windshield and a roof, said windshield having upper and lower ends, said roof having rearward and forward ends, a mirror system mounted on the roof of the cab to enable a person within the cab to ascertain the loading condition of the truck body without leaving the cab, said mirror system comprising a mirror support means secured to the roof of the cab, a first mirror secured to said mirror support means and positioned forwardly of the cab windshield adjacent the upper end thereof so that the mirror is visible to the person within the cab, a second mirror secured to said mirror support means above said first mirror and rearwardly thereof with said second mirror facing said first mirror, a third mirror secured to said mirror support means and positioned above and forwardly of said second mirror with said third mirror facing said second mirror, said third mirror being positioned above the body and forwardly thereof so that a view into the interior of the body will be consecutively reflected by said third mirror, said second mirror, and said first mirror respectively for viewing by the person within the cab to enable the person to ascertain the loading condition of the body, and means for longitudinally horizontally adjustably mounting said first mirror on said mirror support means.

8. In combination with a truck having an open truck body positioned rearwardly of a cab including a windshield and a roof, said windshield having upper and lower ends, said roof having rearward and forward ends, a mirror system mounted on the roof of the cab to enable a person within the cab to ascertain the loading condition of the truck body without leaving the cab, said mirror system comprising a mirror support means secured to the roof of the cab, a first mirror secured to said mirror support means and positioned forwardly of the cab windshield adjacent the upper end thereof so that the mirror is visible to the person within the cab, a second mirror secured to said mirror support means above said first mirror and rearwardly thereof with said second mirror facing said first mirror, a third mirror secured to said mirror support means and positioned above and forwardly of said second mirror with said third mirror facing said second mirror, said third mirror being positioned above the body and forwardly thereof so that a view into the interior of the body will be consecutively reflected by said third mirror, said second mirror, and said first mirror respectively for viewing by the person within the cab to enable the person to ascertain the loading condition of the body, and means for vertically adjustably, horizontally adjustably and longitudinally adjustably mounting said second mirror on said mirror support means.

9. In combination with a truck having an open truck body positioned rearwardly of a cab including a windshield and a roof, said windshield having upper and lower ends, said roof having rearward and forward ends, a mirror system mounted on the roof of the cab to enable a person within the cab to ascertain the loading condition of the truck body without leaving the cab, said mirror system comprising a mirror support means secured to the roof of the cab, a first mirror secured to said mirror support means and positioned forwardly of the cab windshield adjacent the upper end thereof so that the mirror is visible to the person within the cab, a second mirror secured to said mirror support means above said first mirror and rearwardly thereof with said second mirror facing said first mirror, a third mirror secured to said mirror support means and positioned above and forwardly of said second mirror with said third mirror facing said second mirror, said third mirror being positioned above the body and forwardly thereof so that a view into the interior of the body will be consecutively reflected by said third mirror, said second mirror, and said first mirror respectively for viewing by the person within the cab to enable the person to ascertain the loading condition of the body, and means for vertically adjustably mounting said third mirror on said mirror support means.

10. In combination with a truck having an open truck body positioned rearwardly of a cab including a windshield and a roof, said windshield having upper and lower ends, said roof having rearward and forward ends, a mirror system mounted on the roof of the cab to enable a person within the cab to ascertain the loading condition of the truck body without leaving the cab, said mirror system comprising a mirror support means secured to the roof of the cab, a first mirror secured to said mirror support means and positioned forwardly of the cab windshield adjacent the upper end thereof so that the mirror is visible to the person within the cab, a second mirror secured to said mirror support means above said first mirror and rearwardly thereof with said second mirror facing said first mirror, a third mirror secured to said mirror support means and positioned above and forwardly of said second mirror with said third mirror facing said second mirror, said third mirror being positioned above the body and forwardly thereof so that a view into the interior of the body will be consecutively reflected by said third mirror, said second mirror, and said first mirror respectively for viewing by the person within the cab to enable the person to ascertain the loading condition of the body, and means for longitudinally horizontally adjustably mounting said third mirror on said mirror support means.

11. In combination with a truck having an open truck body positioned rearwardly of a cab including a windshield and a roof, said windshield having upper and lower ends, said roof having rearward and forward ends, a mirror system mounted on the roof of the cab to enable a person within the cab to ascertain the loading condition of the truck body without leaving the cab, said mirror system comprising a mirror support means secured to the roof of the cab, a first mirror secured to said mirror support means and positioned forwardly of the cab windshield adjacent the upper end thereof so that the mirror is visible to the person within the cab, a second mirror secured to said mirror support means above said first mirror and rearwardly thereof with said second mirror facing said first mirror, a third mirror secured to said mirror support means and positioned above and forwardly of said second mirror with said third mirror facing said second mirror, said third mirror being positioned above the body and forwardly thereof so that a view into the interior of the body will be consecutively reflected by said third mirror, said second mirror, and said first mirror respectively for viewing by the person within the cab to enable the person to ascertain the loading condition of the body, and means for laterally adjustably mounting said third mirror on said mirror support means.

12. In combination with a truck having an open truck body positioned rearwardly of a cab including a windshield and a roof, said windshield having upper and lower ends, said roof having rearward and forward ends, a mirror system mounted on the roof of the cab to enable a person within the cab to ascertain the loading condition of the truck body without leaving the cab, said mirror system comprising a mirror support means secured to the roof of the cab, a first mirror secured to said mirror support means and positioned forwardly of the cab windshield adjacent the upper end thereof so that the mirror is visible to the person within the cab, a second mirror secured to said mirror support means above said first mirror and rearwardly thereof with said second mirror facing said first mirror, a third mirror secured to said mirror support means and positioned above and forwardly of said second mirror with said third mirror facing said second mirror, said third mirror being positioned above the body and forwardly thereof so that a view into the interior of the body will be consecutively reflected by said third mirror, said second mirror, and said first mirror respectively for viewing by the person within the cab to enable the person to ascertain the loading condition of the body, and means for swivel mounting said first mirror on said mirror support means.

13. In combination with a truck having an open truck body positioned rearwardly of a cab including a windshield and a roof, said windshield having upper and lower ends, said roof having rearward and forward ends, a mirror system mounted on the roof of the cab to enable a person within the cab to ascertain the loading condition of the truck body without leaving the cab, said mirror system comprising a mirror support means secured to the roof of the cab, a first mirror secured to said mirror support means and positioned forwardly of the cab windshield adjacent the upper end thereof so that the mirror is visible to the person within the cab, a second mirror secured to said mirror support means above said first mirror and rearwardly thereof with said second mirror facing said first mirror, a third mirror secured to said mirror support means and positioned above and forwardly of said second mirror with said third mirror facing said second mirror, said third mirror being positioned above the body and forwardly thereof so that a view into the interior of the body will be consecutively reflected by said third mirror, said second mirror, and said first mirror respectively for viewing by the person within the cab to enable the person to ascertain the loading condition of the body, and means for swivel mounting said second mirror on said mirror support means.

14. In combination with a truck having an open truck body positioned rearwardly of a cab including a windshield and a roof, said windshield having upper and lower ends, said roof having rearward and forward ends, a mirror system mounted on the roof of the cab to enable a person within the cab to ascertain the loading condition of the truck body without leaving the cab, said mirror system comprising a mirror support means secured to the roof of the cab, a first mirror secured to said mirror support means and positioned forwardly of the cab windshield adjacent the upper end thereof so that the mirror is visible to the person within the cab, a second mirror secured to said mirror support means above said first mirror and rearwardly thereof with said second mirror facing said first mirror, a third mirror secured to said mirror support means and positioned above and forwardly of said second mirror with said third mirror facing said second mirror, said third mirror being positioned above the body and forwardly thereof so that a view into the interior of the body will be consecutively reflected by said third mirror, said second mirror, and said first mirror respectively for viewing by the person within the cab to enable the person to ascertain the loading condition of the body, and means for selectively pivotally mounting said third mirror about a horizontal axis on said mirror support means.

15. The combination of claim 14 including means for pivoting said third mirror about an axis disposed at right angles to said horizontal axis.

16. In combination with a truck having an open truck body positioned rearwardly of a cab including a windshield and a roof, said windshield having upper and lower ends, said roof having rearward and forward ends, a mirror system mounted on the roof of the cab to enable a person within the cab to ascertain the loading condition of the truck body without leaving the cab, said mirror system comprising a mirror support means secured to the roof of the cab, a first mirror secured to said mirror support means and positioned forwardly of the cab windshield adjacent the upper end thereof so that the mirror is visible to the person within the cab, a second mirror secured to said mirror support means above said first mirror and rearwardly thereof with said second mirror facing said first mirror, a third mirror secured to said mirror support means and positioned above and forwardly of said second mirror with said third mirror facing said second mirror, said third mirror being positioned above the body and forwardly thereof so that a view into the interior of the body will be consecutively reflected by said third mirror, said second mirror, and said first mirror respectively for viewing by the person within the cab to enable the person to ascertain the loading condition of the body, and means for selectively horizontally and vertically adjustably mounting said first, second and third mirrors on said mirror support means.

* * * * *